United States Patent [19]

Reimers

[11] E Patent Number: Re. 33,203

[45] Reissued Date of Patent: Apr. 24, 1990

[54] GOLF BAG DEVICE

[76] Inventor: Eric W. Reimers, 235 N. First St., Missoula, Mont. 59802

[21] Appl. No.: 336,018

[22] Filed: Apr. 10, 1989

Related U.S. Patent Documents

Reissue of:

[64] Patent No.: 4,685,561
Issued: Aug. 11, 1987
Appl. No.: 783,767
Filed: Oct. 3, 1985

[51] Int. Cl.[5] ..... A63B 55/00; A63B 55/06

[52] U.S. Cl. ..... 206/315.5; 206/315.3; 206/315.6; 206/315.7; 248/96

[58] Field of Search ..... 206/315.2–315.7; 248/96; 211/70.2; 280/DIG. 6

[56] References Cited

U.S. PATENT DOCUMENTS

| | | | |
|---|---|---|---|
| 693,432 | 2/1902 | Owen | 206/315.5 |
| 1,404,559 | 1/1922 | Watrous | 248/96 |
| 1,597,870 | 8/1926 | Reach | 206/315.6 |
| 1,612,741 | 12/1926 | Butler | 206/315.6 X |
| 1,672,549 | 6/1928 | Thompson | 206/315.6 |
| 1,726,245 | 8/1929 | Shelton | 206/315.6 X |
| 1,790,092 | 1/1931 | Diguid et al. | 248/96 |
| 1,838,699 | 12/1931 | McMontes et al. | 206/315.6 |
| 1,880,351 | 10/1932 | McDonald | 248/96 |
| 1,890,362 | 12/1932 | Bellow | 206/315.7 |
| 2,186,491 | 1/1940 | Meyer | 206/315.7 |
| 2,602,676 | 7/1952 | Fieldhouse | 280/DIG. 6 X |
| 2,628,801 | 2/1953 | Gunning | 248/96 |
| 3,283,793 | 11/1966 | Kish, Jr. | 206/315.8 |
| 3,432,130 | 3/1969 | Breedlove | 248/96 |
| 3,842,876 | 10/1974 | Cristelli | 206/315.4 |
| 4,142,563 | 3/1979 | Ackerfeldt et al. | 206/315.6 X |
| 4,155,387 | 5/1979 | Costa | 206/315.6 |
| 4,172,484 | 10/1979 | Henning | 206/315.6 |
| 4,226,389 | 10/1980 | Neth | 248/[illegible] |
| 4,245,684 | 1/1981 | Street et al. | 206/315.[illegible] |
| 4,311,178 | 1/1982 | Kennedy | 206/31[illegible] |
| 4,350,194 | 9/1982 | Brown | 206/315.5 |
| 4,383,563 | 5/1983 | Kirchhoff, Jr. | 206/315.2 |
| 4,522,299 | 6/1985 | Clark | 206/315.3 |
| 4,596,328 | 6/1986 | Solheim | 206/315.6 |

FOREIGN PATENT DOCUMENTS

| | | | |
|---|---|---|---|
| 4992 | of 1895 | United Kingdom . | |
| 29240 | of 1907 | United Kingdom | 248/96 |
| 8333 | of 1911 | United Kingdom | 206/315.5 |
| 358195 | 10/1931 | United Kingdom . | |
| 527306 | 10/1940 | United Kingdom . | |
| 714316 | 8/1954 | United Kingdom . | |
| 804722 | 11/1958 | United Kingdom | 280/DIG. 6 X |
| 1418463 | 12/1975 | United Kingdom | 206/315.5 |

*Primary Examiner*—Sue A. Weaver
*Attorney, Agent, or Firm*—Michael J. Hughes

[57] ABSTRACT

The present invention in its preferred embodiment is a golf bag device (10) including an interior divider (34) which forms full length club storage compartments (26, 28, 30, and 32) in the bag portion (12). The bag has a longitudinal axis which is offset from the horizontal, thus improving club access. The interior divider (34) is formed from a single sheet of lightweight plastic. The divider (34) further provides longitudinal spatial integrity to the bag (10). The bag portion (12) is further provided with storage pouches (41 and 43) strategically situated so as to avoid contact with the ground. The bag (10) has a rounded triangular cross section to create greater stability when the bag (10) is laid down. The shape of the collar member (22) and the internal compartments (26, 28, 30 and 32) maximizes convenience to the golfer during club storage and retrieval. The use of the rigid interior divider (34) accomplishes the major advantages of heavier, more complex and more expense bags without accompanying detracting factors. The bag is also suitable for use within integral or later installed stand mechanism. The bag (10) will be useful to all golfers, and can be distributed wherever golf equipment is sold.

27 Claims, 3 Drawing Sheets

GOLF BAG DEVICE

Matter enclosed in heavy brackets [ ] appears in the original patent but forms no part of this reissue specification; matter printed in italics indicates the additions made by reissue.

TECHNICAL FIELD

The present invention relates generally to sporting goods and more specifically to golfing equipment.

BACKGROUND ART

Golf is a game that has been popular in many parts of the world for many generations. Part of the game's popularity is due to the fact that it is one of the few "life sports". That is, complete retirement because of age is rarely necessary. Golf provides an excellent vehicle for reasonable exercise for an extremely wide range of people. It also provides outdoor exercise and peaceful settings for mental repose.

The nature of the game requires that a substantial amount of equipment (e.g. clubs) be carried with the golfer as he moves about the course. The clubs are generally carried in some type of golf bag. One of the problems inherent in carrying clubs in a bag is that the clubs are simply mixed together randomly. Therefore, many devices have been designed in an effort to bring order to the golf bag.

Some of these devices are complete golf bags. An example is the "Golf Bag System" of Street, et al, U.S. Pat. No. 4,245,684, issued Jan. 20, 1981. This device is very complex, and the provision for wheels gives the bag the appearance of being difficult, if not impossible, to carry due to its weight. Further, because of the complexity of the device, it is questionable whether the golfer's convenience is increased or decreased. Similar problems manifest themselves in the "Golf Club Carrier" of Donald Embinder, U.S. Pat. No. 4,012,051, issued Mar. 15, 1977, and the "Golf Bag" of Christian H. Kirchhoff, Jr., U.S. Pat. No. 4,383,563, issued May 17, 1983. The Street, Embinder, and Kirchhoff devices also suffer from being too heavy to carry easily.

This problem was addressed by the "Golf Bag" of Luther T. Henning, U.S. Pat. No. 4,172,484, issued Oct. 30, 1979. This bag makes use of lightweight flexible material to decrease overall carry weight. It also attempts to allow for orderly storage of clubs by providing a "honeycombed" interior. A disadvantage of this device is that using fabric for the interior division would make the compartments relatively fragile.

One of the more common methods for trying to establish orderly storage in the golf bag is a device that is meant to be added to a standard golf bag. An exammple is the "Golf Bag Club Separator" of David E. Zopf, U.S. Pat. No. 4,130,153, issued Dec. 19, 1978. The Zopf device is meant to be inserted in the base of a bag. An inherent disadvantage is that the compartments formed by this type of device do not extend the length of the bag.

Other "add on" devices are the "Golf Bag Insert" of Raymond Costa, U.S. Pat. No. 4,155,387, issued May 22, 1979, and the "Interior Space Divider for Golf Bag" of Robert A. Kennedy, U.S. Pat. No. 4,311,178, issued Jan. 19, 1982. While these devices more effectively divide the bag's interior, a disadvantage is created in that the bag is no longer an integral device—two pieces of equipment are required.

None of the prior art effectively provides an easily transportable, integral device that allows effective club separation through division of the bag's interior space.

DISCLOSURE OF INVENTION

Accordingly, it is an object of the present invention to provide a bag that is divided into distinct compartments.

It is a further object of the present invention to provide a method of presenting the clubs to the golfer so as to improve access to the various clubs in the bag, via the angling of the base of the bag.

It is another object of the present invention to provide a device to increase the golfer's comfort by reducing the abrasion potential between the bag and the golfer's body.

It is yet another object of the present invention to provide a device that remains in a more stable position while being carried on the golfer's shoulder or when resting on the ground.

It is still another object to minimize the irritations and aggravations to the golfer based on frustrations or contact with the golf bag.

It is a still further object to provide a bag with integral storage pouches that will be kept off muddy ground while the bag is at rest and away from the golfer's ribs while the bag is being carried.

Briefly, the preferred embodiment of the present invention is a golf bag device. The bag's lateral cross-section is essentially triangular with rounded corners. It is closed at one end, the bottom, by a rigid base plate. In the preferred version, the bag is formed to stand at an angle, the directly vertical position being inhibited. The top end, opposite the closed bottom end, is open, with a cross membered collar that defines interior compartments. The interior compartments are formed by full length dividers which are constructed from a single uncut sheet of plastic. Although the plastic is thin and flexible, after it is bent into the appropriate shape and secured at the ends it becomes relatively rigid. This rigidity provides sufficient support so that the bag is noncollapsible. The primary essence of this invention is embodied in the various aspects following from the uniquely formed compartments separated by the plastic divider and the cross membered collar.

The bag is carried by a standard golf bag strap. The middle section of the strap is padded to provide extra comfort when the bag is being carried. The bag also includes a handle for single-handed carrying. The bag may also be readily combined with an integral stand such as that described in the inventor's simultaneously filed application entitled "Golf Bag with Integral Stand".

An advantage of the present invention is that the golf bag is divided into distinct compartments.

Another advantage of the present invention is that, due to the angling of the bag and the shaping of the compartments, the effects of differing lengths of clubs are minimized so as to provide the golfer easier club selection.

Yet another advantage of the present invention is that the clubs are grouped according to general use.

A further advantage of the present invention is that the abrasion potential between the bag and the golfer's body is reduced due to the bag's unique shape, i.e. it has soft flat sides opposite the golfer.

A still further advantage of the present invention is that the unique shape of the bag allows it to rest more stably while being carried on the golfer's shoulder, and also to resist rolling when laid on the ground.

Another advantage of the present invention is that it is lighter in weight than other compartmentalized bags.

Yet another advantage is that the bag's storage pouches are kept off the ground while the bag is at rest, and away from the golfer's ribs while the bag is being carried.

These and other objects and advantages of the present invention will become clear to those skilled in the art in view of the best presently known mode of carrying out the invention and the industrial applicability of the preferred embodiment as described herein and as illustrated in the several figures of the drawing.

BEST MODE OF CARRYING OUT INVENTION

Figure 1:
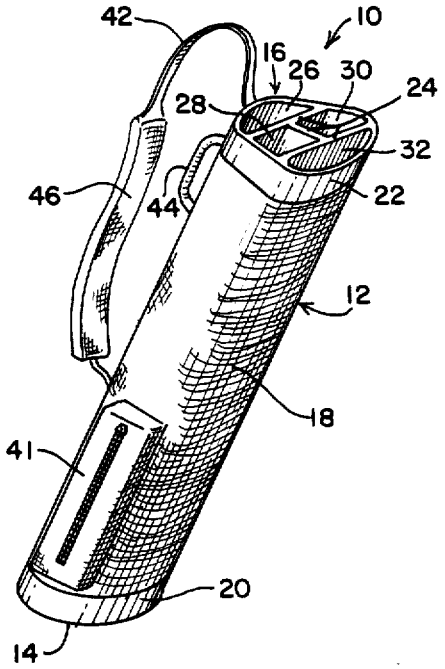
FIG. 1 is a perspective view of the golf bag device of the present invention.

The present invention is a golf bag device directed at providing a golf club carrying apparatus that is divided into distinct compartments so that the clubs are separated, and that rests at an angle so that club selection is facilitated. The preferred embodiment of the invention is illustrated in the drawing and described herein. The description for the most part references FIG. 1.

Figure 2:
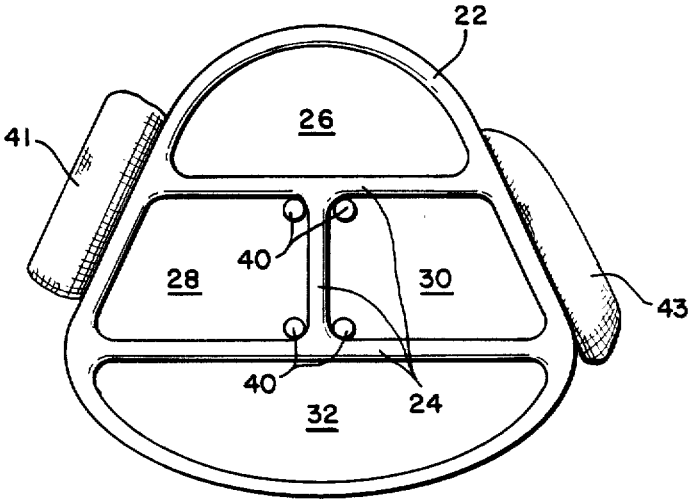
FIG. 2 is a top plan view of the present invention.

As shown in FIG. 1, the preferred embodiment of the present invention is a golf bag device shown in a perspective view and referred to by the general reference character 10. A major component of the invention 10 is a bag portion 12. The bag portion 12 is generally describable as a diagonally cut cylindrical member having a roughly triangular lateral cross section (shown especially in FIG. 2). The triangular cross section's corners are rounded. The bag portion 12 includes a closed base 14 and an open top 16, both having the rounded triangular shape. A fabric exterior 18 is provided to form the circumferential exterior of the bag portion 12 at the axial positions intermediate the base 14 and the top 16.

The bag 10 is constructed such that an axial cross section of the bag portion 12 yields a parallelogram having a rear base angle of approximately 67°. This is best illustrated by the side view of FIG. 6. The closed base 14 is formed with a rigid base plate 20 that encloses the lower end of the fabric portion 18. The fabric exterior portion 18 creates an enclosed volume so that the contents of the bag device 10 are protected from any damaging elements. A rigid collar 22 is attached to the fabric 18 at the open top 16 of the bag portion 12. The collar 22 is divided by multiple internally grooved cross members 24. These cross members 24 define an upper club compartment 26, a left center club compartment 28, a right center club compartment 30, and a lower club compartment 32. The cross members 24 are integral to the collar 22.

In the preferred embodiment, the compartments 26, 28, 30, and 32 are defined for the entire length of the bag portion 12 by an interior divider sheet 34. The interior divider 34 is formed from a single sheet of thin, flexible material. The sheet of material is bent along longitudinal axes so that the shape of the interior divider 34 conforms to the configuration of the cross members 24.

Figure 3:
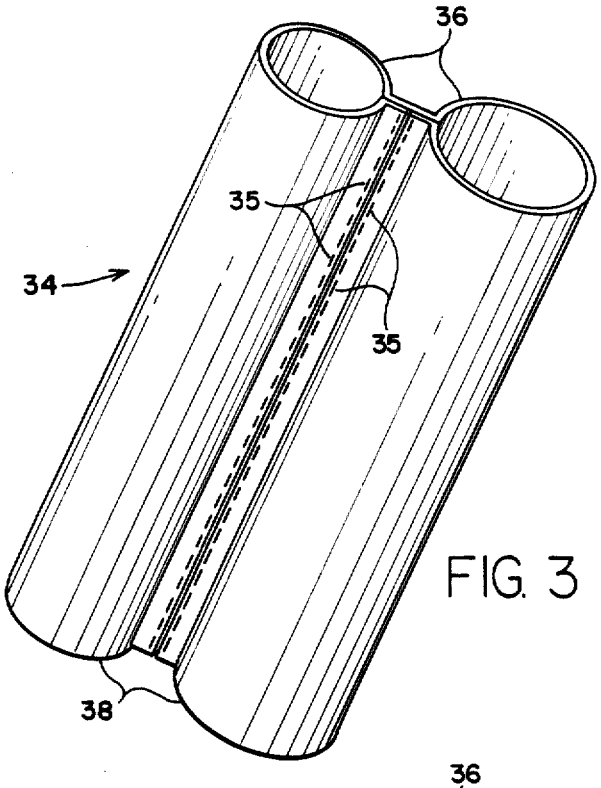
FIG. 3 is a perspective view of the interior divider shown prior to final determination.

The interior divider sheet 34 is formed from a single flat rectangular sheet of plastic measuring about 100 cm (40 in.) vertically and 100 cm (40 in.) horizontally. The first step is to fold the sheet 34 horizontally to line displaced from the perpendicular bisector by 4.1 cm (1.6 in) so that the edges overlap by 6.3 cm (2.5 in.) from the center. The sides are then fastened in place by two rows of stitches 35 so that the sheet 34 takes the shape depicted in FIG. 3. The plastic is then gently heated to increase its pliability. A rigid form longitudinally conforming to the shape of the interior of the bag device 10 and laterally having a cross section equivalent to the compartments 26, 28, 30 and 32 is inserted into the divider sheet 34. When the sheet 34 cools, it retains the desired shape. The form is then removed and the resulting folded sheet 34 has a cross section resembling a figure "8".

Figure 4:
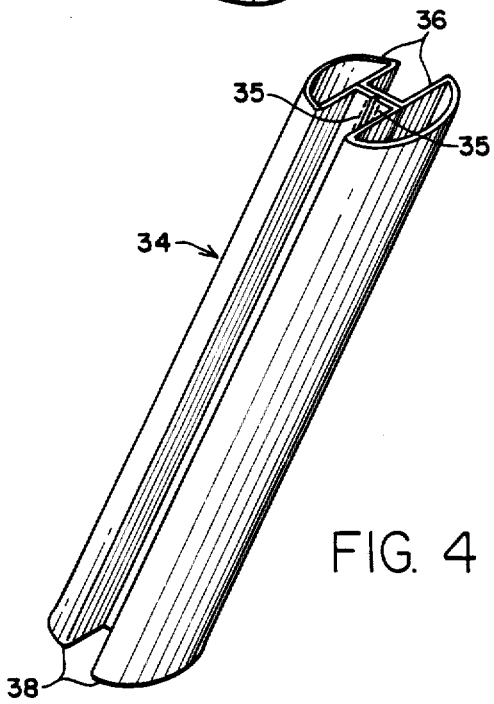
FIG. 4 is a persective view of the interior divider after forming.
Figure 5:
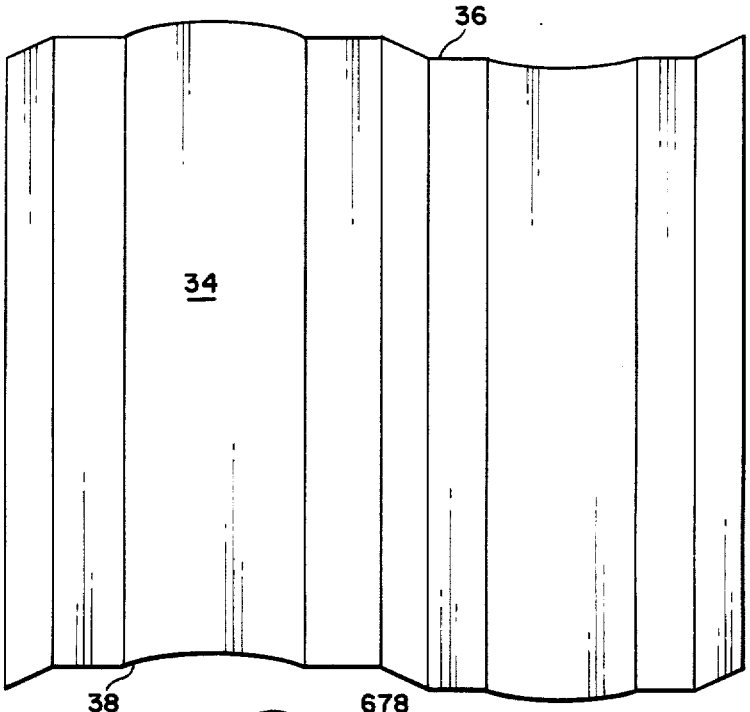
FIG. 5 is a plan view of the divider sheet, shown unfolded, after trimming.

After the folding operation, a top edge 36 and a bottom edge 38 of the interior divider sheet are trimmed so that flat upper and lower edge surfaces having the requisite 67° from angle the base are formed (illustrated in FIG. 4). After trimming, if the interior divider sheet 34 were unfolded, i.e., if it were trimmed prior to folding, rather than vice-versa it would have the irregular shape depicted in FIG. 5.

The end result is that a horizontal cross section of the installed interior divider 34 has the same shape as the cross members 24 and the collar 22 with the exception that the outer walls of the center compartments 28 and 30 are open. The center compartments 28 and 30 therefore are defined on the three interior sides by the interior divider 34 with their outer walls being enclosed by the fabric portion 18. The remaining compartments 26 and 32 are fully enclosed by the divider 34.

During the assembly process, the bottom edge 38 of the interior divider 34 is placed on the base plate 20. The exterior fabric portion 18 is riveted to the base plate 20 and pulled inside out so as not to interfere with further assembly. The lower region of the interior divider 34 is held in position and kept from deforming by means of four positioning posts 40. The posts 40 are integral to the base plate 20 and are situated at the inner corners of the center compartments 28 and 30 (see FIG. 2). These points are where the stress induced by the bending operation is the greatest.

The top edge 36 is then placed into the collar 22 from underneath and inserted into the cross members 24. The collar 22 and cross members 24 are slotted on their undersides so that a mating action with the top edge 38 takes place. Since the collar 22 is rigid, after the mating of the collar 22 and the interior divider 34, the upper region of the interior divider 34 is fixed in place and kept from deforming to an even greater extent than if the shape relied upon were dependent upon material memory alone.

The fabric portion 18 is then pulled up to enclose the interior divider 34, and is riveted to the collar 22. By securing the fabric portion 18 at both ends, the interior divider 34, the base plate 20, and the collar 22 are all permanently anchored in place.

Attached to the exterior of the bag portion 12 are a small storage pouch 41 and a full length storage pouch 43. The small storage pouch 41 is essentially rectangular in shape, and is accessed by a zippered opening. The small storage pouch 41 is located on the side of the bag portion 12 near the closed base 14 and is ordinarily used to contain golf balls, tees and small implements. The full length pouch 43 is teardrop shaped in lateral cross section and extends the length of the fabric portion 18. The full length pouch 43 is located on the side opposite the small pouch 41 and is commonly used to enclose clothing, umbrellas and the like. The pouches 41 and 43 are designed and located so that when filled with equipment, they can encroach upon the open sides of club compartments 28 and 30. This will not interfere with club storage as only the shafts of the clubs would be in this region, so there will be excess space. The location of the pouches 41 and 43 also ensures that due to the stability of the bag 10, the pouches 41 and 43 will not make contact with muddy ground. This protects the golfer's auxilary equipment. Further, the location minimizes contact of the pouches and other rigid element with the golfer's ribs.

The bag device 10 is carried by means of a standard golf bag strap 42 or a handle 44. The strap 42 and the handle 44 are attached near the top of the bag portion 12 along a line connecting the apexes of the triangular radial cross sections. The middle portion of the strap 42 has a shoulder pad 48 to provide greater comfort to the golfer while he carries the bag device 10.

While the configuration and number of compartments 26, 28, 30, and 32 is not critical to the usefulness of the other aspects of the bag device 10, the disclosed configuration was chosen so as to allow for maximal efficiency in club division. The desired arrangement of clubs is envisioned such that the upper club compartment 26 will be used to store woods, the center compartments 28 and 30 for long and middle irons, respectively and the lower compartment 32 for short irons, wedges, and putters. This configuration takes on added importance when the base angle of the bag device 10 is considered. Because of the base angle (67° in the preferred embodiment), when the bag device 10 is at rest, the average distance of the club heads from a given horizontal plane is minimized, thus facilitating club selection. With the standard, perpendicular based bag, the shorter clubs are more apt to be "buries", or at least obscured from view, by the longer clubs.

Figure 6:
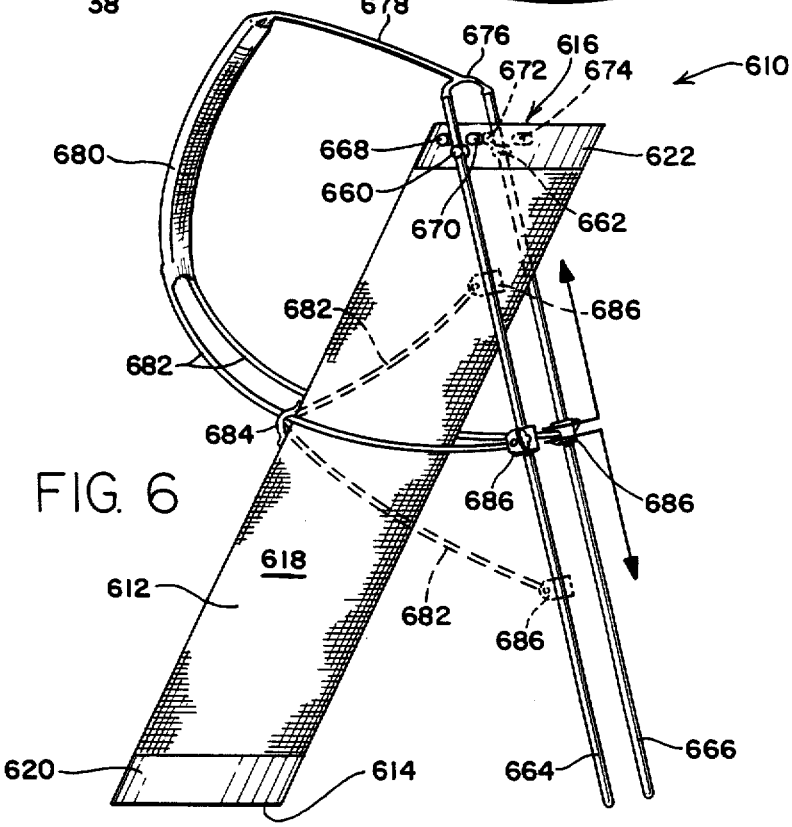
FIG. 6 is a left side elevational view of an alternate embodiment.

An alternate embodiment of the bag is illustrated in FIG. 6 and is designated by the general reference character 610. The main difference between the alternate and preferred embodiments is that the bag 610 is equipped with an integrated golf bag stand, said stand being described in Applicant's simultaneously filed application for a "Gold Bag with Integral Stand," Ser. No. 783,769, Oct. 3, 1985 the contents of which are incorporated by reference herein.

Most of the elements of the alternate embodiment 610 are common with those of the primary embodiment 10. The elements of the alternate embodiment 610 are specified by "600" series numerals. Those elements common to both embodiments will thus carry reference numerals which differ by six hundred, and will not be further described. A cursory description of the elements unique to the alternate embodiment follows.

A left pivot post 660 and a right pivot post 662 are situated to extend outward from approximately the center of the sides of the collar 622. A left support member 664 is attached to the left pivot post 660 and a right support member 666 is attached to the right pivot post 662. The support members 664 and 666 are rigid rods of a length roughly equal to that of the bag portion 612, the exact length being dependent on the desired at-rest angle of the bag.

The range of motion of the support members 664 and 666 about the pivot posts 660 and 662 is restricted by a set of restraining posts 668, 670, 672, and 674. The restraining posts 668, 670, 672, and 674 hold the support members 664 and 666 in the appropriate at-rest and carry positions.

A first transverse member 676 extends between the tops of the support members 664 and 666. One end of a bag strap 678 is attached at the midpoint of the first transverse member 676. The bag strap 678 has a shoulder pad 680 to provide greater comfort to the golfer. The remaining end of the strap 678 is attached to the midpoint of a second transverse member 682 which is threaded through a guide 684. The guide 684 is simply a rigid, U-shaped element attached to the exterior of the bag portion 612 at approximately the midpoint of the line connecting the appexes of the cross sectional triangles.

The second transverse member 682 is attached at each end to the support members 664 and 666 by means of a pair of slidable clamps 686. The clamps 686 are held in position either by a spring loaded clip or by a thumb operably set screw. In FIG. 6, phantom illustrations show the typical range of adjustment of the clamps 686 along the suport members 664 and 666. The purpose of the adjustable clamps 686 is to permit balancing of the bag 610 in accordance with the weight distribution of the contents. Although most of the weight of the bag 610 is borne by the guide 684 during carry mode the structure of the suspension system is such that there is a vertical component to the force vector applied to the support members 664 and 666 by the second transverse member 682 and the clamps 686. Adjustment of the positioning of the clamps 686 on the support members 664 and 666 is useful in optimizing the force vectors to provide the best possible balance and the greatest comfort to the golfer.

When the bag 610 is lowered, the rear tip of the base plate 620 is placed on the ground and the bag assembly 610 is permitted to tip forward while the bag strap 678 is still being held. In this manner the bag strap 678 acts to pull the first transverse member 676 rearward until the top of the left support meber 664 contacts the left rear restraining post 668, and the top of the right support member 666 contacts the right rear restraining post 672. The support members 664 and 666 are thereby fixed in the proper position to maintain the bag 610 in a semi-upright position while placed on the ground in stand mode.

As to the materials to be used in the present invention, it is envisioned that the fabric exterior portion 18 will be made of a flexible material such as high grade nylon, leather, or vinyl to provide maximum protection with minimum weight. However, rigid materials may also be utilized. Waterproof nylon is the preferred material. Similarly, the base plate 20 and the collar 22 are envisioned as being made of high impact plastic, though any rigid material will suffice. The interior divider sheet 34 is preferrably made from polypropylene having a thickness of approximately 0.076 cm (0.030 in.). This is substantially thinner than the polypropylene used for structural purposes in other golf bags. The choices of material for the interior divider are somewhat more limited because of the requirement that the material be flexible, yet relatively rigid when bent. This combination of characteristics allows a very thin plastic sheet to be used for the interior divider sheet 34, which in turn leads to a reduction in overall weight of the bag 10.

The incline angle of the bag 10 at rest, with respect to the ground, is approximately 67°. The bag portion 12 is approximately 82 cm (34 in.) long. The collar has a exterior circumference of approximately 65 cm (26 in.). The individual club compartments 26, 28, 30, and 32 have the following dimensions: upper 5.5 cm (2.2 in.) high at its midpoint and 14 cm (5.6 in.) wide at its maximum width; center (each) 6.3 cm (2.4 in) maximum height and 9 cm (3.6 in.) maximum width; and lower 6 cm (2.4 in) high and 19 cm (7.5 in) wide.

INDUSTRIAL APPLICABILITY

The golf bag device 10 of the present invention will be useful to any golfer. The club compartments 26, 28, 30 and 32 separate the clubs into categories of general use. This in itself is an improvement. The fact that the bag device 10 rests at an angle and thereby keeps the club heads more nearly in a single plane further eases the process of club selection.

The unique shape of the bag portion 12 leads to two further advantages. First, the golfer's ribs are not as aggressively assaulted, the relatively flat and pliant surface 20 of the bag portion 12 increasing the area over which the shock force is distributed. Furthermore, the lower center of gravity coupled with the flatter surface make it far less likely the bag device 10 will roll and spill clubs, balls, etc.

The present invention provided a compartmentalized bag that is lighter to carry. This provides for increased convenience without increased effort. This in turn can decrease frustration. It is a given fact that any golfer will want anything that may reduce frustration. Therefore, the device 10 should be popular in the golf equipment market. Even a cursory survey of pro shops, sporting goods stores, or sporting goods departments in department stores will indicate the size of this market.

For the above reasons, it is expected that the golf bag device of the present invention will have widespread industrial applicability. Any golfer desirous of making his life somewhat more convenient can appreciate the present invention. Therefore, it is expected that the commercial utility of the present invention will be quite extensive.

I claim:

1. A golf bag device comprising:

a bag portion in which the clubs and other equipment are stored, the bag portion having a closed end and an open end and being enclosed to form a generally tubular element, the bag portion including a rigid collar situated at said open end, a rigid base situated at said closed end, exterior enclosing means adapted to extend between said collar and said base to separate the interior from the exterior of the bag portion, and an interior divider adapted to separate the interior volume of the bag portion into a plurality of distinct, full length compartments; and carrying means attached to the bag portion by which the bag device may be lifted and transported;

wherein the bag portion is characterized by having a longitudinal cross-section in the nature of a parallelogram, with said base and said collar forming lower and upper surfaces, respectively, which are parallel to a setting surface when the bag portion is in a rest mode, the rest mode being when the bag portion is placed upon such a setting surface such that said lower surface of said base abuts thereagainst and the side edges of said parallelogram, formed by the enclosing means, are offset from vertical in said rest mode defining an angle of incline for the bag device.

2. The device of claim 1 wherein:

the bag portion has a rounded triangular horizontal cross section when placed in said rest mode on a horizontal surface.

3. The device of claim 1 wherein the bag portion further includes:

a plurality of storage pouches formed on the exterior thereof, said pouches being positioned so as to be urged away from contact with the ground when the bag is laid down.

4. The device of claim 1 wherein:

the angle of incline of the bag portion in said rest mode is about 67° from horizontal.

5. The device of claim 1 wherein:

said interior divider is formed from a single sheet of resilient but structurally rigid material.

6. The device of claim 1 wherein:

said interior divider is constructed of lightweight plastic.

7. The device of claim 1, wherein said full length compartments include an upper compartment, a left side center compartment, a right side center compartment and a bottom compartment.

8. The device of claim 1, wherein said enclosing means is a flexible fabric tube.

9. In a gold bag device including an elongated tubular bag portion for enclosing the shaft portions of golf clubs when not in immediate use and a carrying handle or strap for transporting the device, the improvement comprising:

means forming the bag portion to include a base, a body portion, and a top arranged with the body portion at an angle such that when the base rests on a horizontal surface the top, while being parallel to the base, is not directly above the base but is horizontally offset therefrom such that the bag portion is situated at an angle of inclination of between 50° to 75° from horizontal; and means providing a full length interior divider to longitudinally divide the interior of the body portion into a plurality of discrete compartments.

10. The improvement of claim 9, wherein said angle of inclination is 67°.

11. The improvement of claim 9, wherein said divider means is in the form of a flexible sheet folded and secured so as to define, with the circumference bag portion surface, four of said compartments.

12. The improvement of claim 11 wherein:

said four compartments include an upper, a lower, a right side center and a left side center compartment, with the circumferential boundaries of said compartments being fully defined by said flexible sheet except that the left side boundary of said left side center compartment and the right side boundary of said right side center compartment are defined by the tubarlar bag portion of the bag device.

13. The improvement of claim 12, wherein said full length divider means is formed by folding and trimming a single sheet of flexible material and securing said sheet within the bag portion.

14. The improvement of claim 13 wherein:

said sheet is formed of thin, lightweight plastic.

15. The improvement of claim 9 and further including an attached stand mechanism to support the bag device at said angle of inclination.

16. The improvement of claim 13 wherein said angle of inclination of 67°.

17. The improvement of claim 9, wherein a horizontal cross section of the bag portion is generally in the shape of a rounded triangle.

*18. A golf bag device, comprising:*

*a bag portion in which the clubs and other equipment are stored, the bag portion having a closed end and an open end and being enclosed to form a generally tubular element, the bag portion including a rigid collar situated at said open end, a rigid base situated at said closed end exterior enclosing means adapted to extend between said collar and said base to separate the interior from the exterior of the bag portion; and*

*carrying means attached to the bag portion by which the bag device may be lifted and transported;*

*wherein the bag portion is characterized by having a longitudinal cross-section in the nature of a parallelogram, with said base and said collar forming lower and upper surfaces, respectively, which are parallel to a setting surface when the bag portion is in a rest mode, the rest mode being when the bag portion is placed upon such a setting surface such that said lower surface of said base abut thereagainst, and the side edges of said parallelogram, formed by the enclosing means, are offset from vertical in said rest mode defining an angle of incline for the bag device.*

*19. The device of claim 18 wherein:*

*the bag portion has a rounded triangular horizontal cross section when placed in said rest mode on a horizontal surface.*

*20. The device of claim 18 wherein the bag portion further includes:*

*a plurality of storage pouches formed on the exterior thereof, said pouches being positioned so as to be urged away from contact with the ground when the bag is laid down.*

*21. The device of claim 18 wherein:*

*Said angle of incline of the bag portion in said rest mode is about 67 degrees from horizontal*

*22. The device of claim 18 wherein:*

*said enclosing means is a flexible fabric tube.*

*23. In a golf bag device including an elongated tubular bag portion for enclosing the shaft portions of golf clubs when not in immediate use and a carrying handle or strap for transporting the device, the improvement comprising:*

*means forming the bag portion to include a base, a body portion, and a top arranged with the body portion at an angle such that when the base rests on a horizontal surface the top, while being parallel to the base, is not directly above the base but is horizontally offset therefrom such that the bag portion is situated at an angle of inclination of between 50 degrees and 75 degrees from horizontal.*

*24. The improvement of claim 23 wherein*

*said angle of inclination is 67 degrees.*

*25. The improvement of claim 23 and further including an attached stand mechanism to support the bag device at said angle of inclination.*

*26. The improvement of claim 25 wherein*

*said angle of inclination is 67 degrees.*

*27. The improvement of claim 23 wherein*

*a horizontal cross section of the bag portion is generally in the shape of a rounded triangle.*

* * * * *